United States Patent
Li et al.

(10) Patent No.: US 8,111,641 B2
(45) Date of Patent: Feb. 7, 2012

(54) JOINT DETECTION (JD) METHOD FOR ADJACENT CELLS IN TDD/CDMA SYSTEM

(75) Inventors: Feng Li, Shanghai (CN); Guilang Yang, Shanghai (CN); Tiezhu Xu, Shanghai (CN); Ke Wang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 913 days.

(21) Appl. No.: 11/915,057

(22) PCT Filed: Apr. 26, 2006

(86) PCT No.: PCT/CN2006/000795
§ 371 (c)(1),
(2), (4) Date: Apr. 17, 2008

(87) PCT Pub. No.: WO2006/125366
PCT Pub. Date: Nov. 30, 2006

(65) Prior Publication Data
US 2008/0205305 A1    Aug. 28, 2008

(30) Foreign Application Priority Data
May 26, 2005    (CN) .......................... 2005 1 0072100

(51) Int. Cl.
*H04J 3/00*    (2006.01)
(52) U.S. Cl. ....................................................... 370/280
(58) Field of Classification Search .................. 370/276, 370/277, 280, 294, 342, 310, 328, 431, 433, 370/441, 458, 464, 479; 455/403, 422.1, 455/434, 436–444, 450, 39, 500, 507, 517, 455/67.11
See application file for complete search history.

(56) References Cited

U.S. PATENT DOCUMENTS
2002/0018454 A1*    2/2002    Misra et al. .................. 370/336
(Continued)

FOREIGN PATENT DOCUMENTS
CN    1553586    12/2004
(Continued)

OTHER PUBLICATIONS
India Office Action Application No. 2093/MUMNP/2007 dated Feb. 25, 2011.

*Primary Examiner* — Derrick Ferris
*Assistant Examiner* — Omar Ghowrwal
(74) *Attorney, Agent, or Firm* — Stephen A. Bent; Foley & Lardner LLP

(57) ABSTRACT

A method for performing multi-user joint-detection in a neighboring cell in a TDD-CDMA system presets slot types and includes: a network device configuring a slot type of each uplink slot in its administrated cells and a base station of each cell obtaining a slot type of each uplink slot in a neighboring cell from the network device; the network device configuring for each user a slot for transmitting uplink data and a midamble and channelization code to be used according to the slot type of each uplink slot and a service type of each user in each cell; each user in each cell using the configured midamble and channelization code to transmit uplink data in the configured slot; and the base station detecting activated code channels in the neighboring cell according to the received uplink data transmitted by users in the neighboring cell and obtaining midamble used by each user in the neighboring cell according to the channeliazation codes of the activated code channels and according to the slot type of each uplink slot in the neighboring cell so that the base station may perform the multi-user joint-detection in the neighboring cell.

9 Claims, 1 Drawing Sheet

U.S. PATENT DOCUMENTS

Figure 1:
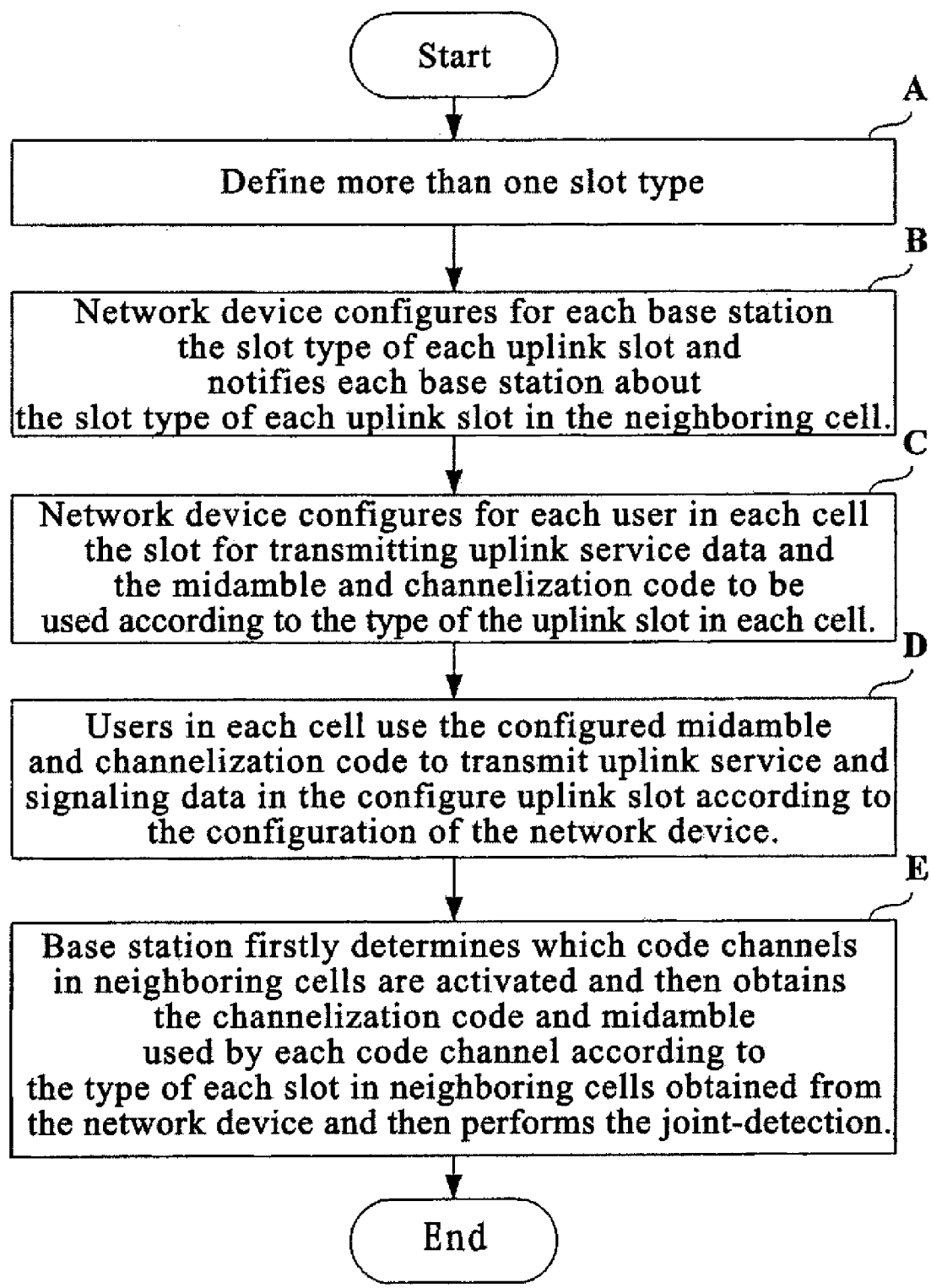

| | | |
|---|---|---|
| 2002/0120058 A1 | 8/2002 | Kozawa et al. |
| 2002/0150058 A1* | 10/2002 | Kim et al. ............... 370/280 |
| 2005/0058103 A1* | 3/2005 | Jeong et al. ............. 370/335 |
| 2006/0234702 A1* | 10/2006 | Wiberg et al. .......... 455/432.3 |
| 2006/0239214 A1* | 10/2006 | Zeira et al. ............. 370/280 |

FOREIGN PATENT DOCUMENTS

| | | |
|---|---|---|
| CN | 1588823 | 3/2005 |
| CN | 1674455 | 9/2005 |
| EP | 1 469 610 A1 | 10/2004 |
| WO | WO 02/09375 A1 | 1/2002 |

\* cited by examiner

JOINT DETECTION (JD) METHOD FOR ADJACENT CELLS IN TDD/CDMA SYSTEM

FIELD

The present invention relates to multi-user joint-detection technology in a TDD-CDMA (Time Division Duplex-Code Division Multiple Access) system, and especially to a method for performing multi-user joint-detection in a neighboring cell in a TDD-CDMA system.

BACKGROUND

In a CDMA (Code Division Multiple Access) system, signals of multiple users are overlapped in time domain and frequency domain. Since signals of different users are correlated, signals of different users at the receiver will create some interference and this kind of interference is called MAI (multiple access interference). Although the MAI of one user is small, with an increase in user number or signal power, the MAI will become one of the most important interferences for the CDMA system.

The TD-SCDMA system may eliminate the above multiple access interference by the multi-user joint-detection technology to increase an anti-interference ability of the system. The multi-user joint-detection refers to that when the receiver separate the received signals, it doesn't regard the MAI as the interference signal but fully makes use of the prior information included in the MAI such as midambles used by each user and channelization codes used by each user, and separates signals of all the users from the received signals. Through the above multi-user joint-detection, the anti-interference ability of the TDD-CDMA system can be greatly improved and the capacity and coverage of the system is improved.

One premise to perform the multi-user joint-detection is to obtain user information of each user which specifically includes midambles and channelization codes used by each user. It is known that in a TD-SCDMA (Time Division Synchronous Code Division Multiple Access) system, a base station may perform a channel estimation by firstly judging which code channels are activated according to an activation detecting algorithm and then obtaining the midamble corresponding to each code channel according to a corresponding relation between each channelization code and each midamble so that it can further finish the multi-user joint-detection.

Generally, the corresponding relation between each channelization code and each midamble can be determined by a pre-defined allocation mode of the midambles or can be notified to the base station by the network side through a high layer signaling. According to the specification of protocols, there are three allocation modes for midambles which are default, common and specific. According to the TD-SCDMA protocol, the corresponding relation between each channelization code and each midamble is defined under different midamble allocation modes and at different channel estimation windows K.

Since there are many different allocation modes of midambles and in different allocation modes, the corresponding relation between each channelization code and each midamble is different and since allocations of midambles between neighboring cells are independent, no matter the base station or the UE (user equipment) can only obtain information of users in the present cell and cannot obtain information of users in a neighboring cell. Therefore, the above multi-user joint-detection is limited in the present cell and a uniform multi-user joint-detection cannot be performed on uplink signals of users in the present cell and the neighboring cell, i.e. the above multi-user joint-detection can only suppress the MAI between users in the present cell and cannot eliminate the MAI from users in a neighboring cell. In a case when the present cell works in different frequency than the neighboring cell, the MAI between users in the neighboring cell will not influence much on the system capacity and performance. However, in the case of co-frequency networking, the MAI between users in the neighboring cell cannot be neglected.

SUMMARY

In order to solve the above problem, the present invention provides a method for performing a multi-user joint-detection in a neighboring cell in a TDD-CDMA system, which can make a base station accurately obtain midambles and channelization codes used by users in the neighboring cell so that can perform the multi-user joint-detection in the neighboring cell.

According to the method of the present invention, types of slots are preset and each type of slot defines a spreading factor, a channel estimation window number and a corresponding relation between each midmable and each channelization code used by each uplink slot; the method includes: a. a network device configuring a slot type of each uplink slot in its administrated cells and a base station of each cell obtaining a slot type of each uplink slot in a neighboring cell from the network device; b. the network device configuring for each user a slot for transmitting uplink data and a midamble and channelization code to be used according to the slot type of each uplink slot and a service type of each user in each cell; c. each user in each cell using the configured midamble and channelization code to transmit uplink data in the configured slot; d. the base station detecting activated code channels in the neighboring cell according to the received uplink data transmitted by users in the neighboring cell and obtaining midamble used by each user in the neighboring cell according to the channeliazation codes of the activated code channels and according to the slot type of each uplink slot in the neighboring cell so that the base station may perform the multi-user joint-detection in the neighboring cell.

The network device configuring a slot type of each uplink slot in its administrated cells specifically includes the network device configuring the slot type of each uplink slot in all the cells according to the predefined slot type of each uplink slot in each cell.

The network device configuring a slot type of each uplink slot in its administrated cells specifically includes the network device configuring the slot type of each uplink slot in all the cells according to the uplink service type of each user in each cell and notifying the base station of the corresponding cell about the configured uplink slot type.

The network device notifies the base station about the slot type of each uplink slot in the present cell through a Node B application part message.

The network device notifies the base station about the slot type of each uplink slot in the present cell through an operation and maintenance message.

In step a, the base station obtains the slot type of each uplink slot in the neighboring cell through the Node B application part message.

In step a, the base station obtains the slot type of each uplink slot in the neighboring cell through the operation and maintenance message.

The configuration in step b is realized through a high layer signaling in the TDD-CDMA system.

The detection in step d adopts an activation detecting algorithm.

The obtaining of the channelization code and the midamble used by each user in neighboring cell specifically includes: d1. the base station determining the channelization code of each detected code channel according to the detected activated code channel; d2. the base station obtaining a midamble corresponding to each channelization code according to the detected channelization code of each code channel and according to the corresponding relation between each channelization code and each midamble defined by the slot type of each uplink slot in the neighboring cell.

According to the present invention, the base station is notified about the slot type of each uplink slot in neighboring cells after multiple slot types are predefined and the slot type of each uplink slot of each base station is determined so that the base station in the system can obtain the corresponding relation between each channelization code and each midamble used by users in neighboring cells. Thus, after the base station detects the code channel of a neighboring cell by the activation detecting algorithm, it can accurately the channelization code and the midamble used by each user in the neighboring cell so that the base station can apply the user information in the multi-user joint detection and thus improve the anti-interference ability of the TDD-CDMA system and also the objective of improving the system capacity and coverage is achieved.

DRAWINGS

FIG. 1 is a flow chart of determining user information in a neighboring cell according to a method of the present invention.

DETAILED DESCRIPTION

In order to make the objective, solution and advantage of the present invention more apparent, the present invention will be described in detail with reference to embodiments and accompany drawings.

In order to achieve a multi-user joint-detection on users in a neighboring cell, a base station must obtain user information of users in the neighboring cell, i.e. the base station must firstly obtain a midamble and a channelization code used by users in the neighboring cell. As shown in FIG. 1, the method of the present invention mainly includes the following steps.

A. Define more than one slot type in the TDD-CDMA system.

The slot type in the present invention refers to a spreading factor (SF) used by each uplink slot and different slot type defines different channel estimation window number K and different corresponding relations between midambles and channelization codes.

In a preferred embodiment of the present invention, 4 slot types are defined, including:

Type 1: the SF used by the slot service data is 8, the SF sued by the signaling data is 16, the channel estimation window number K defined by the slot is 8 and the corresponding relation between the midamble and the channelization code is shown in Table 1.

TABLE 1

| | |
|---|---|
| $m^{(1)}\text{-}c_8^{(1)}$ | $m^{(1)}\text{-}c_{16}^{(1)}$ |
| | $m^{(1)}\text{-}c_{16}^{(2)}*$ |
| $m^{(2)}\text{-}c_8^{(2)}$ | $m^{(2)}\text{-}c_{16}^{(3)}$ |
| | $m^{(2)}\text{-}c_{16}^{(4)}*$ |

TABLE 1-continued

| | |
|---|---|
| $m^{(3)}\text{-}c_8^{(3)}$ | $m^{(3)}\text{-}c_{16}^{(5)}$ |
| | $m^{(3)}\text{-}c_{16}^{(6)}*$ |
| $m^{(4)}\text{-}c_8^{(4)}$ | $m^{(4)}\text{-}c_{16}^{(7)}$ |
| | $m^{(4)}\text{-}c_{16}^{(8)}*$ |
| $m^{(5)}\text{-}c_8^{(5)}$ | $m^{(5)}\text{-}c_{16}^{(9)}$ |
| | $m^{(5)}\text{-}c_{16}^{(10)}*$ |
| $m^{(6)}\text{-}c_8^{(6)}$ | $m^{(6)}\text{-}c_{16}^{(11)}$ |
| | $m^{(6)}\text{-}c_{16}^{(12)}*$ |
| $m^{(7)}\text{-}c_8^{(7)}$ | $m^{(7)}\text{-}c_{16}^{(13)}$ |
| | $m^{(7)}\text{-}c_{16}^{(14)}*$ |
| $m^{(8)}\text{-}c_8^{(8)}$ | $m^{(8)}\text{-}c_{16}^{(15)}$ |
| | $m^{(8)}\text{-}c_{16}^{(16)}*$ |

Type 2: the SF used by the slot service data is 2, the SF sued by the signaling data is 16, the channel estimation window number K defined by the slot is 2 and the corresponding relation between the midamble and the channelization code is shown in Table 2.

TABLE 2

| | |
|---|---|
| $m^{(1)}\text{-}c_2^{(1)}$ | $m^{(1)}\text{-}c_{16}^{(1)}$ |
| | $m^{(1)}\text{-}c_{16}^{(2)}*$ |
| | $m^{(1)}\text{-}c_{16}^{(3)}*$ |
| | $m^{(1)}\text{-}c_{16}^{(4)}*$ |
| | $m^{(1)}\text{-}c_{16}^{(5)}*$ |
| | $m^{(1)}\text{-}c_{16}^{(6)}*$ |
| | $m^{(1)}\text{-}c_{16}^{(7)}*$ |
| | $m^{(1)}\text{-}c_{16}^{(8)}*$ |
| $m^{(2)}\text{-}c_2^{(2)}$ | $m^{(2)}\text{-}c_{16}^{(9)}$ |
| | $m^{(2)}\text{-}c_{16}^{(10)}*$ |
| | $m^{(2)}\text{-}c_{16}^{(11)}*$ |
| | $m^{(2)}\text{-}c_{16}^{(12)}*$ |
| | $m^{(2)}\text{-}c_{16}^{(13)}*$ |
| | $m^{(2)}\text{-}c_{16}^{(14)}*$ |
| | $m^{(2)}\text{-}c_{16}^{(15)}*$ |
| | $m^{(2)}\text{-}c_{16}^{(16)}*$ |

Type 3: the SF used by the slot service data is 8 or 2, wherein when the SF is 2, the channelization code is $c_2^{(1)}$, the SF sued by the signaling data is 16, the channel estimation window number K defined by the slot is 8 and the corresponding relation between the midamble and the channelization code is shown in Table 3.

TABLE 3

| | |
|---|---|
| $m^{(1)}\text{-}c_2^{(1)}$ | |
| $m^{(5)}\text{-}c_8^{(5)}$ | $m^{(5)}\text{-}c_{16}^{(9)}$ |
| | $m^{(5)}\text{-}c_{16}^{(10)}*$ |
| $m^{(6)}\text{-}c_8^{(6)}$ | $m^{(6)}\text{-}c_{16}^{(11)}$ |
| | $m^{(6)}\text{-}c_{16}^{(12)}*$ |
| $m^{(7)}\text{-}c_8^{(7)}$ | $m^{(7)}\text{-}c_{16}^{(13)}$ |
| | $m^{(7)}\text{-}c_{16}^{(14)}*$ |
| $m^{(8)}\text{-}c_8^{(8)}$ | $m^{(8)}\text{-}c_{16}^{(15)}$ |
| | $m^{(8)}\text{-}c_{16}^{(16)}*$ |

Type 4: the SF used by the slot service data is 8 or 2, wherein when the SF is 2, the channelization code is $c_2^{(2)}$, the SF sued by the signaling data is 16, the channel estimation window number K defined by the slot is 8 and the corresponding relation between the midamble and the channelization code is shown in Table 4.

TABLE 4

| | |
|---|---|
| $m^{(1)}\text{-}c_8^{(1)}$ | $m^{(1)}\text{-}c_{16}^{(1)}$ |
| | $m^{(1)}\text{-}c_{16}^{(2)}*$ |
| $m^{(2)}\text{-}c_8^{(2)}$ | $m^{(2)}\text{-}c_{16}^{(3)}$ |
| | $m^{(2)}\text{-}c_{16}^{(4)}*$ |
| $m^{(3)}\text{-}c_8^{(3)}$ | $m^{(3)}\text{-}c_{16}^{(5)}$ |
| | $m^{(3)}\text{-}c_{16}^{(6)}*$ |

TABLE 4-continued

| | |
|---|---|
| $m^{(4)}\text{-}c_8^{(4)}$ | $m^{(4)}\text{-}c_{16}^{(7)}$ |
| | $m^{(4)}\text{-}c_{16}^{(8)}$* |
| $m^{(5)}\text{-}c_2^{(2)}$ | |

The channelization codes with * in Table 1 to Table 4 are assistant channelization codes.

Through the above 4 slot types defined in the present embodiment, different types of uplink services can be realized. For example, the above code channel with the SF of 8 can be used to realize a 12.2 kbps voice service; two code channels with the SF of 8 can be used to realize a 32 kbps voice service; the above code channel with the SF of 2 can be used to realize a 64 kbps voice service; two code channels with the SF of 2 can be used to realize a 128 kbps voice service; the code channel with the SF of 16 can still be used to realize a single channel associated signaling. The above shows although the method of the present embodiment limits the spreading factor of each slot, the normal uplink service transmission of the TDD-CDMA system will not be influenced.

It should be noted that the slot types defined by the present embodiment are only preferred slot types for realizing the present invention. Those skilled in the art will understand that any other slot types that can realize different typical services may be defined and are not limited to the above Type 1 to Type 4. In addition, the corresponding relation between each midamble and each channelization code defined by each slot type is not limited to those shown in Table 1 to Table 4 and will not go beyond the protection scope of the present invention.

In order to be compatible with the traditional systems, the method of the present invention can define the fifth slot type, Type 0, which doesn't restrict on the SF and the corresponding relation between each midamble and each channelization code. When this slot type is used, UE may transmit uplink service and signaling data with the traditional methods.

B. The network device (radio network controller) configures for each cell the slot type of each uplink slot according to the uplink service type of users in each cell and makes each uplink slot in each cell have a determined slot type and after configuration, notifies the base station of each cell about the slot type of each uplink slot in the neighboring cell.

In step B, the network device can adopt many ways to configure the slot type of each uplink slot of the base station and notify each base station about the slot type of each uplink slot in the neighboring cell, for example, through the Node B application part (NBAP) message or through the operation and maintenance message. Since in the above preferred embodiment, 5 kinds of message types are defined, only three bits are required to identify these 5 kinds of message types.

In practice, the TDD-CDMA system can predetermine the slot type of each uplink slot in each cell so that the base station and the network device (RNC) can directly determine the slot type of each uplink slot and don't need to obtain the above information through the NBAP or operation and maintenance messages.

It should be stated that in order to realize the multi-user joint-detection, the network device should notify each base station about code group information used by its neighboring cells while issuing the type of each uplink slot in neighboring cells, wherein the code group information refers to information distinguishing different cells such as the downlink pilot code, scrambling code and basic midamble etc.

C. The network device configures for each user in each cell the slot for transmitting uplink service data or signaling data and the midamble and channelization code to be used through the high layer signaling according to the type of the uplink slot in each cell configured in step B.

In this step, the configuration of the slot for transmitting uplink service data or signaling data and the midamble and channelization code to be used by the network device for each user can be realized by the traditional wireless resource configuration method.

D. Users in each cell use the configured midamble and channelization code to transmit uplink service and signaling data in the configure uplink slot according to the configuration of the network device.

E. The base station firstly determines which code channels in neighboring cells are activated according to a traditional activation detecting algorithm and according to the code group information of neighboring cells and then obtains the corresponding relation between each channelization code and each midamble used by users in neighboring cells according to the type of each slot in neighboring cells obtained from the network device and then obtains the midamble used by each user according to the channelization code of the activated code channel and then performs the channel estimation according to the midamble used by each user so as to achieve the multi-user joint-detection in neighboring cells.

An example will be given to illustrate the method of the present invention in detail.

Supposing cell A is neighboring to cell B and a user UE1 in cell A requests to begin a 64 kbps data service and another user UE2 in cell A requests to begin a 12.2 kbps voice service.

The network device firstly determines that the 64 kbps data service of UE1 needs to occupy a code channel with the SF of 2 and that UE2 needs to occupy a code channel with the SF of 8 according to the service type of the UE1 and UE2 and the predefined slot type, so that it can be determined that cell A may use the uplink slot of Type 3 or Type 4 according to the predefined slot type. Supposing the network device selects the slot type of Type 3, the network device configures the base station of cell A with the determined slot type of Type 3 of the current slot and notifies the base station of cell B that the slot type used by cell A of the current slot is Type 3.

Then, the network device will configure wireless resources used by each user in cell A through the high layer signaling according to the configured slot type of Type 3, i.e. configure that the midamble used by UE1 in this slot is $m^{(1)}$ and the channelization code used is $c_2^{(1)}$, the midamble used by UE2 in this slot is $m^{(5)}$ or $m^{(6)}$ or m or $m^{(8)}$ and the channelization code used correspondingly is $c_8^{(5)}$ or $c_8^{(6)}$ or $c_8^{(7)}$ or $c_8^{(8)}$.

If the network devices configures that the midamble used by UE2 in this slot is $m^{(5)}$ and the channelization code used is $c_8^{(5)}$, then in this slot, UE1 will regard $m^{(1)}$ as its midamble and use channelization code $c_2^{(1)}$ to transmit uplink data and UE2 will regard $m^{(5)}$ as its midamble and use channelization code $c_8^{(5)}$ to transmit uplink data.

When cell B neighboring to cell A receives an uplink signal transmitted by a user in cell A, it will determine that $c_2^{(1)}$ and $c_8^{(5)}$ in cell A in the current slot are activated according to the traditional activation detecting algorithm. Cell B has already known that the type of the current slot in cell A is Type 3 according to the notification from the network device and thus the base station of cell B obtains that midambles used by two users in cell A are $m^{(1)}$ and $m^{(5)}$ respectively according to the corresponding relation between each channelization code and each midamble defined by the slot type of Type 3. Then, the base station of cell B can perform the channel estimation according to the obtained midambles used by users in cell A and further finish the multi-user joint-detection on users in neighboring cells.

The above shows that according to the method of the present invention, the base station may determine the slot type of each uplink slot in its cell or neighboring cells according to the predefined slot type and through some ways. Thus, when the base station detects the code channel of a neighboring cell according to the activation detecting algorithm, it may accurately obtain the channelization code and midamble used by each user in the neighboring cell so that the base station may apply the obtained user information in the multi-user joint-detection and thus realizes the joint-detection on users in neighboring cells.

What is claimed is:

1. A method for performing multi-user joint-detection in a neighboring cell in a Time Division Duplex-Code Division Multiple Access (TDD-CDMA) system,
   the method comprising:
   a. a network device configuring a slot type of each uplink slot in its administrated cells and a base station of each cell obtaining a slot type of each uplink slot in a neighboring cell from the network device;
   b. the network device configuring for each user a slot for transmitting uplink data and a midamble and channelization code to be used according to the slot type of each uplink slot and an uplink service type of each user in each cell;
   c. each user in each cell using the configured midamble and channelization code to transmit uplink data in the configured slot; and
   d. the base station detecting activated code channels in the neighboring cell according to the received uplink data transmitted by users in the neighboring cell and obtaining the midamble used by each user in the neighboring cell according to the channelization codes of the activated code channels and based on the slot type of each uplink slot in the neighboring cell so as to be used by the base station to perform the multi-user joint-detection in the neighboring cell,
   wherein said obtaining comprises:
     d1. determining the channelization code of each detected code channel according to the detected activated code channels; and
     d2. obtaining a midamble corresponding to each channelization code according to the channelization code of each detected code channel and according to the corresponding relation between each channelization code and each midamble defined by the slot type of each uplink slot in the neighboring cell,
   wherein types of slots are preset and each type of slot defines a spreading factor, a channel estimation window number and a corresponding relation between each midamble and each channelization code used by each uplink slot.

2. The method according to claim 1, wherein the network device configuring a slot type of each uplink slot in its administrated cells includes
   the network device configuring the slot type of each uplink slot in all the cells according to the predefined slot type of each uplink slot in each cell.

3. The method according to claim 1, wherein the network device configuring a slot type of each uplink slot in its administrated cells includes
   the network device configuring the slot type of each uplink slot in all the cells according to the uplink service type of each user in each cell and notifying the base station of the corresponding cell about the configured uplink slot type.

4. The method according to claim 3, wherein the network device notifies the base station of the slot type of each uplink slot in the present cell through a Node B application part message.

5. The method according to claim 3, wherein the network device notifies the base station about the slot type of each uplink slot in the present cell through an operation and maintenance message.

6. The method according to claim 1, wherein in step a, the base station obtains the slot type of each uplink slot in the neighboring cell through a Node B application part message.

7. The method according to claim 1, wherein in step a, the base station obtains the slot type of each uplink slot in the neighboring cell through an operation and maintenance message.

8. The method according to claim 1, wherein the configuration in step b is performed by high layer signaling in the TDD-CDMA system.

9. The method according to claim 1, wherein the detection in step d adopts an activation detecting algorithm.

* * * * *